US009758608B2

(12) United States Patent
Hampel et al.

(10) Patent No.: US 9,758,608 B2
(45) Date of Patent: Sep. 12, 2017

(54) PLASTICIZER HAVING CATIONIC SIDE CHAINS WITHOUT POLYETHER SIDE CHAINS

(71) Applicant: SIKA TECHNOLOGY AG, Baar (CH)

(72) Inventors: Christina Hampel, Rütihof (CH); Jörg Zimmermann, Winterthur (CH); Jabbar Alshemari, Zürich (CH); Markus Friederich, Kilchberg (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 14/426,028

(22) PCT Filed: Oct. 23, 2013

(86) PCT No.: PCT/EP2013/072163
§ 371 (c)(1),
(2) Date: Mar. 4, 2015

(87) PCT Pub. No.: WO2014/067832
PCT Pub. Date: May 8, 2014

(65) Prior Publication Data
US 2015/0232597 A1    Aug. 20, 2015

(30) Foreign Application Priority Data

Oct. 29, 2012  (EP) .................................... 12190373

(51) Int. Cl.
*C08F 222/10* (2006.01)
*C04B 24/28* (2006.01)

(52) U.S. Cl.
CPC .......... *C08F 222/10* (2013.01); *C04B 24/283* (2013.01)

(58) Field of Classification Search
CPC .............................. C08F 222/10; C04B 24/283
USPC ............................................................ 524/5
See application file for complete search history.

(56) References Cited

U.S. PATENT DOCUMENTS

| 5,536,311 A * | 7/1996 | Rodrigues ............... C04B 24/16 |
| | | 106/724 |
| 6,691,715 B2 * | 2/2004 | Matz ................... A61K 8/8158 |
| | | 132/202 |
| 7,261,772 B1 | 8/2007 | Schwartz et al. |
| 2007/0083020 A1 | 4/2007 | Schinabeck et al. |
| 2007/0287794 A1 | 12/2007 | Alain et al. |
| 2008/0033129 A1 | 2/2008 | Schechtman et al. |
| 2010/0087569 A1 | 4/2010 | Friedrich et al. |
| 2012/0048466 A1 * | 3/2012 | Eckert ..................... C04B 28/02 |
| | | 156/336 |
| 2012/0231991 A1 | 9/2012 | Mukherjee et al. |

FOREIGN PATENT DOCUMENTS

| EP | 2463317 A1 | 6/2012 |
| WO | 98/58887 A1 | 12/1998 |
| WO | 2005035603 A1 | 4/2005 |
| WO | 2008015653 A2 | 2/2008 |
| WO | 2008049549 A2 | 5/2008 |

OTHER PUBLICATIONS

"Melflux superplasticizers," BASF SE (2016), [retrieved on Oct. 6, 2016]. Retrieved from the Internet: <https://www.basf.com/us/en/General-Business-Topics/dispersions/Products/melflux.html>.*
May 5, 2015 International Preliminary Report on Patentability issued in International Patent Application No. PCT/EP2013/072163.
Jun. 7, 2016 Chinese Office Action issued in Chinese Application No. 201380047429.X.
Jan. 2, 2014 International Search Report issued in International Patent Application No. PCT/EP2013/072163.
Shengping, "Class G/H Basic Cement for Oil Wells," Yunan Building Materials Institute XinJiang, No. 4, pp. 8-13, Dec. 15, 1995.
Dec. 12, 2016 Office Action issued in Chinese Application No. 201380047429.X.
May 18, 2017 Office Action issued in Chinese Patent Application No. 201380047429.X.
Liqiang, Jin, et al. "Synthesis and application of the amphoteric acrylic polyelectrolyte as retanning agent". China Leather, vol. 33, No. 15, p. 3-6.

* cited by examiner

*Primary Examiner* — Josephine Chang
(74) *Attorney, Agent, or Firm* — Oliff PLC

(57) ABSTRACT

The invention relates to the use of at least one comb polymer which includes side chains which have at least one cationic group, and does not include side chains having polyether groups, and which has a main chain which has carboxyl groups, as dispersant for hydraulically settable compositions. The invention also relates to hydraulically settable cement compositions, moldings, comb polymers and method for producing comb polymers.

23 Claims, 4 Drawing Sheets

PLASTICIZER HAVING CATIONIC SIDE CHAINS WITHOUT POLYETHER SIDE CHAINS

The invention relates to the use of at least one comb polymer which comprises side chains that have at least one cationic group, and does not comprise side chains having polyether groups, as a dispersant for hydraulically settable compositions. The invention also relates to hydraulically settable cement compositions, moldings, comb polymers and methods for producing comb polymers.

PRIOR ART

In construction engineering, in the processing of hydraulically settable compositions such as cements and gypsum, dispersants, which act in particular as plasticizers, are added. Adding such plasticizers decreases the water content, thereby improving the workability of the paste-like compositions and increasing the stability of the cured products. One important group of such dispersants comprises comb polymers made of polycarboxylic acids with polyalkylene glycol side chains (polycarboxylate ethers, PCE). These are referred to as comb polymers because they have a single base polymer ("backbone"), to which a plurality of side chains is covalently bonded, so that the molecular structure as a whole resembles a comb. A multiplicity of such comb polymers exists which, in addition to ester groups and free carboxyl groups, can also have amide groups.

Gypsum is an important building material which is used for a multiplicity of applications. Curable gypsum compositions are used, for example, for producing gypsum plasterboard, as drywall compound or wall plaster, or for producing floor plaster. When processing gypsum, it is desirable to decrease the water content. This makes the set gypsum less porous and therefore more stable. Moreover, a lower water content makes a shorter drying process sufficient, thereby accelerating processing and conserving energy.

Hydraulically settable binders made of natural minerals, such as gypsum, frequently contain a certain proportion of clay. However, customary comb polymers are not effective or are only marginally effective as dispersants in hydraulically settable compositions containing clay. Comb polymers interact in an undesirable manner with clay particles in clay-containing gypsum compositions, and are therefore unable to achieve the desired effect.

To solve this problem, it is proposed in the prior art to add additives that will neutralize the negative effects of clay, or that will achieve a dispersive and plasticizing effect, in particular in clay-containing compositions.

U.S. Pat. No. 7,261,772 B1 describes a gypsum composition which, in addition to water, gypsum and clay, contains polyoxyalkylenes, an amine compound and a comb polymer. Using volatile amines is disadvantageous, however, because they produce unpleasant odors and because working with these amines and the release thereof from cured products involves a health hazard. In many applications, particularly in gypsum plasterboard, these disadvantages are unacceptable to users.

WO 98/58887 proposes adding further additives, specifically polyethers based on ethylene oxide and propylene oxide, and low molecular cationic compounds, to clay-containing cement compositions. The disadvantage of this solution is a relatively low effectiveness of the additives, and a high percentage of low-molecular substances which do not themselves act as plasticizers, and which diminish the stability of the cured product.

US 2007/0287794 A1 discloses adding cationic polymers to clay-containing gypsum compositions. These polymers are condensates of primary and secondary amines having suitable reaction partners, such as epichlorohydrin. The reaction products in this case are linear polymers, which bear cationic charges on the polymer main chain. The disadvantage in this case is that, during production of the condensates, compounds are used which cannot be easily handled chemically and in some cases present a health hazard, for example amines, epoxides and cyanide compounds. Furthermore, the results (Table 3 of said document) show that, although the polymers are capable of neutralizing the negative effect of clay in gypsum compositions, they do not achieve any additional plasticizing effect.

EP 2 463 317 A1 proposes adding customary plasticizing polycarboxylate ethers, that is, comb polymers having polyether side chains, to clay-containing gypsum compositions, said polycarboxylate ethers additionally having side chains with cationic groups. These cationic comb polymers therefore combine the properties of customary comb polymers with cationic charges in order to achieve an advantageous interaction with the clay particles. The problem in this case, however, is that the comb polymers are relatively complex. As a result, their production from cationic, anionic and long-chain polyether side chains is rather difficult. Moreover, it is problematic to establish a desired plasticizing effect for a composition having a specific clay content by using such a complex plasticizer, which combines various effects in a single molecule.

US 2012/0231991 A1 discloses comb polymers for use as additives for cleaning agents based on amphoteric polycarboxylates. The side chains of these comb polymers contain cationic groups which are connected to the main chain via polyether groups.

In general, it would be desirable to provide other dispersants which can be used efficiently, variably and in a simple manner, particularly in clay-containing compositions.

WO 2005/035603 A1 discloses sulfonic group-containing copolymers and terpolymers which comprise cationic side chains and sulfonic group-containing side chains, whereas the main chain does not comprise acid groups. Said copolymers and terpolymers also contain at least one additional polymer building block b), which has a terminal amine group. Processing cationic, anionic and aminic monomer building blocks to form a polymer is relatively costly, and a high yield cannot necessarily be expected. The sole detailed embodiment example A1 does not indicate how these three components might be processed to produce a single polymer.

WO 2008/049549 A2 discloses hydrophobically modified, crosslinked polymers comprising at least three different structural units, which polymers are used in hydraulic binders as plasticizers. The polymers have polyether side chains. The polymers are crosslinked during production, for example with tristyrylphenol-PEG-methacrylate, resulting in three-dimensional polymer blocks. Production from at least three components is relatively costly, with the polymers being produced by means of gel polymerization, which results in polymerized gel cubes which are then ground and dried. The products are not comb polymers, and the structure and properties of the products are different from those of comb polymers.

WO 2008/015653 A2 likewise discloses crosslinked polymers which are suitable for cosmetic applications. The products are not comb polymers, and the structure and properties of the products are different from those of comb polymers.

OBJECT OF THE INVENTION

The object of the invention is to overcome the above-described disadvantages. The invention therefore addresses the problem of providing a simple, variable and efficient method for dispersing and plasticizing hydraulically settable compositions, in particular gypsum compositions, especially clay-containing gypsum compositions. The dispersants used for this purpose should be obtainable in a simple and cost-effective manner, and should induce an efficient plasticizing effect. In particular, the goal is to provide dispersants that will eliminate the need to use customary polycarboxylate ethers, or will allow these to be used in only small quantities.

The properties and especially the stability of the cured products should preferably also be improved. In particular, a decrease in water content should result in improved strength.

DISCLOSURE OF THE INVENTION

The object of the invention is unexpectedly attained by applications, compositions, methods and comb polymers according to the claims. Additional advantageous embodiments are disclosed in the description.

The subject matter of the invention is the use of at least one comb polymer which comprises side chains having at least one cationic group and does not comprise side chains having polyether groups, and which comprises a main chain which has carboxyl groups, as a dispersant for hydraulically settable compositions.

The comb polymers without polyether side chains that can be used according to the invention are also referred to in the following as "cationic comb polymers". The cationic comb polymer has cationic groups and may have additional anionic groups. The polymer is therefore a cationic polymer or a zwitterionic polymer. According to the invention, the term "comb polymer" refers to the comb polymer or a salt thereof. Thus a cationic comb polymer in the form of salts with suitable anions may be used, for example as a halide, in particular, as a chloride. If the comb polymer is a zwitterion, it can be used as a salt with suitable anionic or cationic groups. The comb polymer can also be used as an inner salt, in which the cationic and anionic charges are neutralized. If said comb polymer contains acid groups, such as carboxyl groups, these can be fully or partially neutralized.

According to the invention, the cationic comb polymer has at least one cationic group on the side chains, preferably a single cationic group per side chain. In this case, all or only some of the side chains in a polymer may have cationic groups. The cationic group is covalently bonded to the comb polymer and can be a customary cationic group which can be attached to organic polymers, such as an ammonium group, a sulfonium group or a phosphonium group.

In a preferred embodiment of the invention, the cationic group is an ammonium group. A quaternary ammonium group is particularly preferred. In this case, a positively charged nitrogen atom is substituted with four organic residues. The cationic group preferably has the formula —$N^+R^8R^9R^{10}$, in which $R^8$, $R^9$ and $R^{10}$ are each independently H, an aliphatic hydrocarbon residue having 1 to 20 C atoms, a cycloaliphatic hydrocarbon residue having 5 to 8 C atoms, and/or an aryl residue having 6 to 14 C atoms. $R^8$, $R^9$ and $R^{10}$ are preferably not H, and are particularly preferably chosen from methyl and ethyl.

In a preferred embodiment of the invention, the cationic group is a component of a monomeric structural unit, chosen from [2-(acryloyloxy)-ethyl]-trimethylammonium chloride, [2-(acryloylamino)-ethyl]-trimethylammonium chloride, [2-(acryloyloxy)-ethyl]-trimethylammonium methosulfate, [2-(methacryloyloxy)-ethyl]-trimethylammonium chloride or -methosulfate, [3-(acryloylamino)-propyl]-trimethylammonium chloride, [3-(methacryloylamino)-propyl]-trimethylammonium chloride and diallyldimethylammonium chloride (DADMAC).

According to the invention, the use of [2-(methacryloyloxy)-ethyl]-trimethylammonium salts, in particular chloride, has proven particularly advantageous. This use is commercially available from Evonik Industries, DE (under the trade name "Visiomer TMAEMC") or from Sigma-Aldrich, DE.

The cationic group is a component of a side chain. This means that it is not a component of the main chain of the comb polymer. As such, it does not connect subunits of the main chain with one another. It is therefore different, for example, from condensates of dimethylamine and epichlorohydrin as described in US 2007/0287794 A1.

In a preferred embodiment, the comb polymer does not comprise side chains that have acid groups. In particular, the comb polymer does not comprise side chains that have sulfonic groups. In particular, the side chains have no terminal acid groups. The comb polymer according to the invention therefore differs structurally from the polymers from WO 2005/035603 A1, which comprise side chains with terminal sulfonic groups, while the main chain has no acid groups. The comb polymers according to the invention are less complex and have different properties because they are able to bind to hydraulic binder particles via carboxyl groups of the main chain, while the cationic side chains are aligned in the aqueous environment.

In a preferred embodiment of the invention, the comb polymer comprises at least one acid unit A of formula (I), which is described in greater detail below. Acid unit A is incorporated by polymerization into the comb polymer. As a result, the acid group becomes a component of the main chain. Acid unit A is customarily introduced into the polymer by polymerization in the presence of a corresponding acid monomer or a salt or anhydride thereof. Suitable acids for acid unit A include α-unsaturated monocarboxylic or dicarboxylic acids, in particular, acrylic acid, methacrylic acid, maleic anhydride, maleic acid, itaconic acid, crotonic acid or fumaric acid.

The comb polymer is a zwitterionic comb polymer with carboxyl groups. The carboxyl groups are bonded directly to the main chain. Such a main chain is obtained when, during production by polymerization, α-unsaturated carboxylic acid subunits, such as acrylic acid, methacrylic acid or substituted derivatives thereof, are used as monomers, optionally in combination with additional suitable monomers. Such monomers are routine structural units of polycarboxylate ethers. The carboxyl groups are generally considered to be components of the main chain due to their direct proximity thereto.

In a preferred embodiment of the invention, the main chain is a polyacrylic acid, a polymethacrylic acid or a copolymer of acrylic acid and methacrylic acid, wherein said main chain may also contain additional subunits, or wherein the carboxyl groups may be modified in part, for example, by esterification. The polycarboxylic acid or the salt thereof forms the main chain of the comb polymer. The carboxyl groups and the polycarboxylic acid can be in the form of a free acid or a salt; however it is also possible for only some of the acid groups to be present as salts. In that case, the polycarboxylic acid is fully or partially neutralized. According to the invention, the term "salt" comprises both classic salts, which are obtained by neutralization with a base, and complex compounds having metal ions and the carboxyl groups as ligands.

In the production of such polycarboxylic acids, chain length is usually adjusted by means of a chain transfer agent, for example phosphite or sulfite. The polycarboxylic acids can thus contain groups that are not carboxylic acid units, for example, phosphorous- or sulfur-containing groups, and phosphite- or sulfite-containing groups. These groups are frequently attached to the main chain at the ends, and terminate said chain.

In a preferred embodiment of the invention, the comb polymer comprises:

a) at least one acid unit A of formula (I):

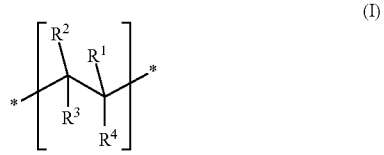

(I)

wherein $R^1$, $R^2$ and $R^3$ each independently stand for H, —COOM, —CH$_2$COOM or an alkyl group having 1 to 5 carbon atoms, each $R^4$ independently stands for —COOM, —CH$_2$COOM, —SO$_2$—OM, —O—PO(OM)$_2$ and/or —PO(OM)$_2$;

or wherein $R^3$ and $R^4$ together form a ring with —CO—O—CO—;

wherein M stands for H, an alkali metal, an alkaline earth metal, ammonium, an ammonium cation, an organic ammonium compound or mixtures thereof;

provided that out of the total, one or two of the groups $R^1$, $R^2$, $R^3$ and $R^4$ are acid groups, wherein acid unit A is preferably an acrylic acid unit or a salt thereof and/or a methacrylic acid unit or a salt thereof; and b) at least one cationic structural unit K of formula (II)

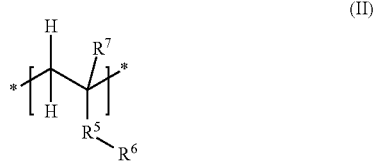

(II)

wherein $R^5$ independently stands for —CO—O—R'—, —NH—R'—, —CO—NH—R'—, —O—, R', —O—R'—, or —R'—O—R'—, with R' being a $C_1$ to $C_{20}$ alkylidene group, which can be branched or unbranched, in particular a methylene-, ethylene- or propylene group;

$R^6$ independently stands for a cationic group, in particular a group of the formula —N$^+$R$^8$R$^9$R$^{10}$, with $R^8$, $R^9$ and $R^{10}$ independently being H, an aliphatic hydrocarbon residue having 1 to 20 C atoms, a cycloaliphatic hydrocarbon residue having 5 to 8 C atoms and/or an aryl residue having 6 to 14 C atoms; and $R^7$ independently stands for H or CH$_3$.

Acid unit A is customarily introduced into the polymer by carrying out polymerization in the presence of a corresponding acid monomer or a salt or anhydride thereof. Suitable acid monomers in this case are particularly α-unsaturated monocarboxylic or dicarboxylic acids, in particular acrylic acid, methacrylic acid, maleic anhydride, maleic acid, itaconic acid, crotonic acid or fumaric acid.

The cationic comb polymer can have at least one additional structural unit C, which is different from structural units A and K. Such structural units C can be freely chosen, as long as they contain no polyether groups. They also should not neutralize or seriously impair the dispersive effect of the comb polymer. The structural unit C is preferably a low-molecular, that is, a non-polymeric structural unit. This unit can be chosen as an ether-, ester-, amide- or imide unit, an acid unit, chosen from carboxylic acid, sulfonic acid, phosphonic acid, phosphoric acid ester, carbonyl-amidomethyl propanesulfonic acid and the salts thereof, or a hydroxyethyloxy carbonyl-, acetoxy-, phenyl- or N-pyrrolidonyl group. The respective groups can be substituted with H or with organic residues, for example, with residues selected independently of one another from H, aliphatic hydrocarbon residues having 1 to 20 C atoms (branched or unbranched), cycloaliphatic hydrocarbon residues having 5 to 8 C atoms and/or aryl residues having 6 to 14 C atoms. Structural unit C can be an ester unit, for example, which is produced by reacting a monocarboxylic or dicarboxylic acid with an alkyl alcohol, in particular a $C_6$-$C_{20}$ alkyl alcohol. Structural unit C can be an amide unit, for example, which is produced by reacting a monocarboxylic or dicarboxylic acid with an alkylamine, in particular a $C_6$-$C_{20}$ alkylamine. Suitable structural units for incorporation into comb polymers are known from the prior art. They are described, for example, in EP 2 463 317 A1, to which express reference is made here, in particular to paragraphs [0022], [0023], [0026] and [0027] (with the exception of embodiments that have polyether groups). Alternatively, the comb polymer can consist of structural units A and K.

The comb polymer can have a combination of different structural units of the respective structural units of A, K and if applicable, C. For example, acid units A which are not neutralized or are not fully neutralized can be mixed into the comb polymer. The individual structural units A, K and C can be in alternating, statistical or block sequence.

In a preferred embodiment of the invention, the comb polymer comprises at least 5 mol %, at least 15 mol % or at least 25 mol % structural units with side chains which have a cationic group. In a preferred embodiment of the invention, the comb polymer comprises 5 to 100 mol %, preferably 15 to 100 mol %, and even more preferably 25 to 100 mol % structural units with side chains which have at least one cationic group, and 0 to 95 mol %, preferably 0 to 85 mol %, and even more preferably 0 to 75 mol % structural units with acid groups, in particular carboxyl groups, in each case relative to the total number of all monomeric structural units of the main chain of the comb polymer.

In a preferred embodiment of the invention, the total of structural units with side chains which have at least one cationic group, and structural units with acid groups, in particular carboxyl groups, is at least 50 mol %, preferably at least 75 mol %, in particular at least 85 mol %, at least 90 mol % or at least 95 mol %, and in a particular embodiment, 100 mol %, in each case relative to the total number of all monomeric structural units of the main chain of the comb polymer.

In a preferred embodiment of the invention, the comb polymer comprises and/or consists of a) 0 to 95 mol %, preferably 10 to 80 mol %, particularly preferably 25-75 mol % acid unit A, in particular acrylic acid units and/or methacrylic acid units (combined),
b) 5 to 100 mol %, preferably 10 to 90 mol %, particularly preferably 25-75 mol % structural unit K, and
c) 0 to 50 mol %, preferably 0 to 20 mol %, in particular 0 to 5 mol % structural unit C, each relative to the total number of all monomeric structural units in the main chain of the comb polymer.

The comb polymer preferably has an average molecular weight $M_n$ ranging from 1,000 to 150,000 g/mol, preferably 2,000 to 100,000 g/mol, particularly preferably 5,000 to 80,000 g/mol.

The comb polymer according to the invention does not comprise side chains having polyether groups. In a preferred embodiment, the comb polymer does not comprise any polyether groups at all. Polyether groups are obtained by polymerizing alcohols that have two or more hydroxyl groups, such as ethylene glycol or propylene glycol. Polycarboxylate ethers, which are used as dispersants in the prior art, usually have polyethylene- and/or polypropylene subunits. In the prior art, it is assumed that such polyether side chains improve the interaction of the comb polymers with the aqueous environment. They serve to hydrophilize the comb polymers, and are intended to enhance the plasticizing effect. It was therefore unexpected according to the invention that comb polymers without polyether groups demonstrate a significant plasticizing action in hydraulically settable compositions, even when said compositions contain clay. Thus according to the invention, in particular no polyether groups of formula —$(R^3O)_n$— are contained, and each $R^3$ independently stands for an alkylidene group, in particular a $C_1$-$C_6$ alkylidene group, in particular for an ethylene- or propylene group. In this case, n is preferably at least 3, at least 5 or at least 10 on average.

In a preferred embodiment of the invention, the comb polymer does not comprise:
c) a structural unit B of formula (I):

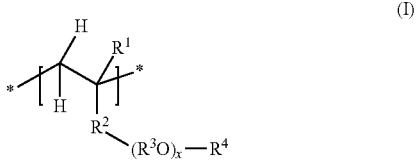

wherein
$R^1$ independently stands for H or $CH_3$;
$R^2$ independently stands for an ester group —CO—O—, an amide group —CO—NH— or a $C_1$-$C_{12}$ alkyl residue,
$R^3$ independently stands for a $C_1$-$C_6$ alkylidene group, in particular for an ethylene group or propylene group,
$R^4$ independently stands for H, a $C_1$-$C_{12}$ alkyl residue or cycloalkyl residue, a $C_7$-$C_{20}$ alkylaryl residue or aralkyl residue, or a substituted or unsubstituted aryl residue, or a monovalent organic residue having 1 to 30 C atoms, which optionally comprises heteroatoms, and
x is at least 3.

In a further preferred embodiment of the invention, the comb polymers used generally do not comprise any longer, hydrophilic side chains. In a preferred embodiment of the invention, the comb polymer does not comprise side chains which have a molecular weight of more than 2000 g/mol, more than 1500 g/mol or more than 1000 g/mol. It was found according to the invention that comb polymers that do not comprise any such longer side chains are also suitable as dispersants and plasticizers.

In a further preferred embodiment of the invention, the comb polymer is a homopolymer of a monomer which comprises a side chain having at least one positive charge. In this case, the monomer for producing the homopolymer and the structural unit with a cationic charge are preferably chosen as described above. The cationic structural unit in the homopolymer is particularly a structural unit K as described above. In this embodiment, the comb polymer as a whole, or at least on the main chain, has no carboxyl groups and no negative charges. Unexpectedly, it was found that such a polymer having a very high cationic charge density achieves a significant effect as a dispersant and a plasticizer in hydraulically settable compositions, even if these contain clay. In clay-containing compositions, the plasticizing effect can even exceed that of customary polycarboxylate ethers.

The term "hydraulically settable composition" is applied to compositions that contain hydraulically settable binders. Such binders cure in the presence of water. Suitable compositions and binders are known to a person skilled in the art of construction chemistry. In a preferred embodiment of the invention, the hydraulically settable binder in the composition is or comprises gypsum, limestone or cement. Customary cements include Portland cements or aluminous cements and mixtures thereof with routine additives.

In a preferred embodiment of the invention, the hydraulically settable composition contains gypsum. Gypsum is a synonym for calcium sulfate. Depending on the production method, gypsum can be in the form of a number of variants which differ in terms of water of crystallization content and in terms of crystal form. In technical terms, said embodiment utilizes the capacity of gypsum to reabsorb water of crystallization that has been removed partially or fully by heating (burning) when water is added, and thereby to set. Since more water is required to ensure workability than is required for setting, the excess water (up to 65%) must be removed again. A moist gypsum composition of this type can be molded. The gypsum can contain calcium sulfate in various crystal forms, for example as β-hemihydrate, alpha-hemihydrate, anhydrite or a mixture thereof. The gypsum can be natural gypsum or a product of flue gas desulfurization plants (FGD gypsum).

In a preferred embodiment of the invention, the hydraulically settable composition contains clay. Clays are weathering products of feldspars. They comprise the remaining aluminum silicate once the alkali- and alkaline earth portions have been dissolved out. Traditional forms of clay include kaolinite, montmorillonite and bentonite. The clay content of the hydraulically settable binder, such as gypsum or cement, can be between 0.1 and 15 wt %, in particular between 0.2 and 10 wt % or between 0.5 and 5 wt %, for example. The binder is particularly preferably a clay-containing gypsum. Natural gypsum, depending on the natural mineral deposit, can contain a percentage of clay.

The gypsum composition according to the invention preferably contains at least 15 wt %, preferably at least 50 wt %, even more preferably at least 70 wt % or at least 95 wt % clay-containing gypsum, relative to the total weight. The clay-containing gypsum composition according to the invention can be anhydrous or can contain less than 0.5, 1 or 5 wt % water. However, it can also contain up to 10, 20, 50 or 80 wt % water. In a preferred embodiment, the percentage of cationic comb polymer in a clay-containing gypsum composition according to the invention is between 0.01 and 2 wt %, in particular between 0.05 and 1 wt %.

The hydraulically settable composition optionally contains additives. Suitable additives are customary additives such as fly ash, silica fume, slag, blast furnace sands and limestone fillers. Additives such as sand, gravel, stone, quartz dust, chalks, accelerators, corrosion inhibitors, retarding agents, shrinkage reducers, defoaming agents or pore formers may also be used.

The cationic comb polymer is preferably used in a quantity of 0.01 to 5 wt %, in particular 0.05 to 2 wt % or 0.1 to 1 wt %, relative to the weight of the hydraulically settable binder. The comb polymer can be added separately or as a composition that contains the comb polymer, and in solid or liquid form. The comb polymer is preferably used in the form of a liquid composition, in particular as an aqueous solution.

The cationic comb polymer is used as a dispersant, particularly as a plasticizer, as a water reducer, for improving the workability and/or for improving the flowability of the hydraulically settable compositions produced with said comb polymer, and for improving the stability of the cured products. In particular, hydraulically settable compositions with extended workability can be obtained according to the invention. This means that, once the water and the comb polymer have been added, the composition remains workable for an extended period of time as compared with compositions that do not contain the comb polymer.

According to the invention, the flowability of a hydraulically settable composition is increased. Adding the cationic comb polymer preferably increases flow table spread by at least 5%, in particular more than 10%, even more preferably by more than 15% or more than 25%, in each case as compared with an identical composition without cationic polymer. Flow table spread is determined, for example, using a flowable sample with 0.2 wt % cationic comb polymer (relative to the quantity of hydraulically setting binder, in particular after mixing with water and 30 seconds of vigorous stirring in a mini-cone measuring 50 mm, at a fill level of 51 mm, after 75 seconds. Flow table spread can be determined as described in the embodiment examples. Standard conditions according to DIN EN 132790-2 or DIN EN 12350-5—Testing fresh concrete—part 5: Flow table spread are used.

The cationic comb polymer can be used as a dispersant or as a constituent of a dispersant in conjunction with additional components. Suitable additional constituents include other plasticizers, for example polycarboxylate ethers (PCE), lignosulfonates, sulfonated naphthalene-formaldehyde condensates or sulfonated melamine-formaldehyde condensates; or accelerators, retarding agents, shrinkage reducers, defoaming agents, air pore formers or foaming agents. The percentage of comb polymer is typically 5 to 100 wt %, in particular 20 to 100 wt %, relative to the total weight of the dispersant.

The cationic comb polymer or a comb polymer-containing composition can also be used in a solid aggregate form, for example as floccules, powder, flakes, pellets, granules or disks. Solid additives of this type can be readily transported and stored. In the solid aggregation state, the comb polymer can be a constituent of a so-called dry mixture, for example a cement composition, which can be stored for long periods of time and is typically packaged in sacks or stored in silos, and then used. Such a dry mixture can be used even after extended periods of storage and is readily pourable.

The comb polymer can be added to a hydraulically settable composition with or shortly before or shortly after water is added. Adding the comb polymer in the form of an aqueous solution or dispersion, in particular as tempering water or as part of the tempering water, has proven particularly suitable. The aqueous solution is produced particularly by a later blending with water. However, the cationic comb polymer can also be added to a hydraulically settable composition before or during the grinding process, for example the process of grinding cement clinker to cement.

In one embodiment of the invention, the reaction product from the synthesis of the cationic comb polymer which has not been further purified is used as a dispersant. Due to the high concentration and stability of the comb polymers in these aqueous compositions, purification is not absolutely necessary. However, additional components may also be added prior to use. In a further embodiment, the comb polymer can be purified prior to its use as a dispersant, for example by separating out additional components, for example by filtration.

In a preferred embodiment of the invention, no additional dispersant and no additional comb polymer is used. It was found that the cationic comb polymer achieves an effective plasticizing action even without polyether side chains.

In a preferred embodiment of the invention, the hydraulically settable composition contains at least one additional dispersant. In this case, an additional comb polymer is preferably used, which comprises side chains having polyether groups, which side chains are bonded via ester-, amide- and/or ether groups to a main chain, wherein the main chain has carboxyl groups. Such comb polymers are also referred to as polycarboxylate ethers (PCE). This known comb polymer preferably has no cationic groups. According to the invention, it was found that it is particularly advantageous to use such a customary polycarboxylate ether, which has no cationic groups, together with a comb polymer according to the invention, which comprises cationic side chains without polyether group side chains. The volume ratio of polycarboxylate ethers to cationic comb polymers according to the invention can be between 1:10 and 10:1, for example, in particular between 1:2 and 2:1. Without being bound to a theory, the cationic comb polymer could neutralize the clay particles, allowing the polycarboxylate ethers to produce their known plasticizing effect without impacting the clay particles. It is an advantage of this process that conventional polycarboxylate ether, which is relatively complex to synthesize and therefore costly, can be saved.

A further subject matter of the invention is a hydraulically settable composition containing a hydraulically settable binder and at least one zwitterionic comb polymer, which comprises a main chain which has carboxyl groups, and comprises side chains which have a cationic group, wherein the comb polymer does not comprise side chains with polyether groups. The hydraulically settable binder is preferably gypsum, with the composition preferably containing clay.

A further subject matter of the invention is moldings, obtainable by setting and curing a hydraulically settable composition according to the invention. According to the invention, the term "molding" refers to any three-dimensional solid which has been given a shape, such as movable structural elements, building sections, bases or coatings. Preferably, the molding is gypsum plasterboard.

A further subject matter of the invention is zwitterionic comb polymers comprising a main chain which has carboxyl groups, and side chains which have at least one cationic group, wherein the comb polymer does not comprise side chains with polyether groups. In preferred embodiments, the zwitterionic comb polymer corresponds to the above-described cationic comb polymers, which are suitable for use according to the invention. In the interest of avoiding repetition, for a description of the chemical structure of these comb polymers, reference is made to the above statements.

A further subject matter of the invention is a method for producing the zwitterionic comb polymers according to the invention, comprising the following steps:

(A) preparing a reaction mixture which contains at least one monomer having an unsaturated group and a carboxyl group, and at least one monomer having an unsaturated group and a cationic group, and (B) polymerizing the reaction mixture to obtain the zwitterionic comb polymer.

The polymerization is preferably of the free radical type. All the monomers in this case preferably have a structural unit C=C—CO—.

Essentially two known methods for producing comb polymers are used in the prior art. In one method, comb polymers of this type are produced from unsaturated carboxylic acid-, ester-, ether-, amide- and/or imide-functional monomers by free radical polymerization. This first method is preferred according to the invention. In an alternative method, the polymers are produced by so-called "polymer-like reaction" from a polycarboxylic acid, which has acrylic acid units and/or methacrylic acid units, with alcohols and/or amines. In this process, the side chains are attached by esterification and/or amidation to the polycarboxylic acid, resulting in the comb polymer.

The uses, methods and cationic comb polymers without polyether side chains according to the invention attain the object of the invention. Novel and efficient dispersants and plasticizers for hydraulically settable compositions are provided according to the invention. Said dispersants and plasticizers are particularly suitable for gypsum compositions that contain clay. The comb polymers according to the invention which comprise cationic side chains without polyether groups are relatively easy to produce and have a strong plasticizing effect. The examples demonstrate that they not only neutralize the clay in the hydraulically setting composition, but can also have a plasticizing effect. With the comb polymers according to the invention, users can and optimize the properties of a hydraulically settable composition in a simple manner.

The comb polymers according to the invention are advantageous because they can be produced without polyether subunits. In the prior art, it is generally routine to equip generic comb polymers with polyether side chains. Production without polyether side chains simplifies the production method and reduces production costs. This is of great importance with generic comb polymers, which are used in large quantities in the construction industry.

Figure 1:
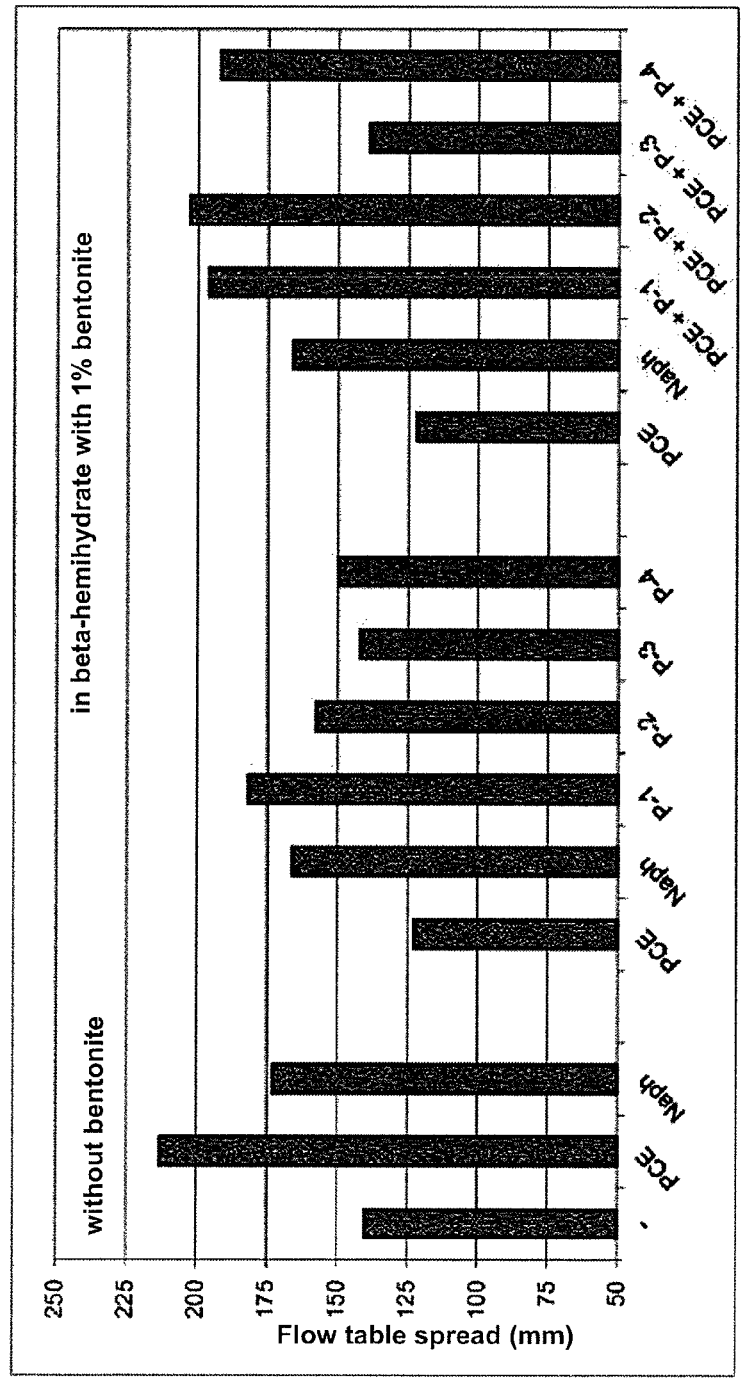
FIG. 1 is a graphic illustration of the results for embodiment examples 5 to 19. For each example, the flow table spread in mm, as indicated in table 2, is represented.
Figure 2:
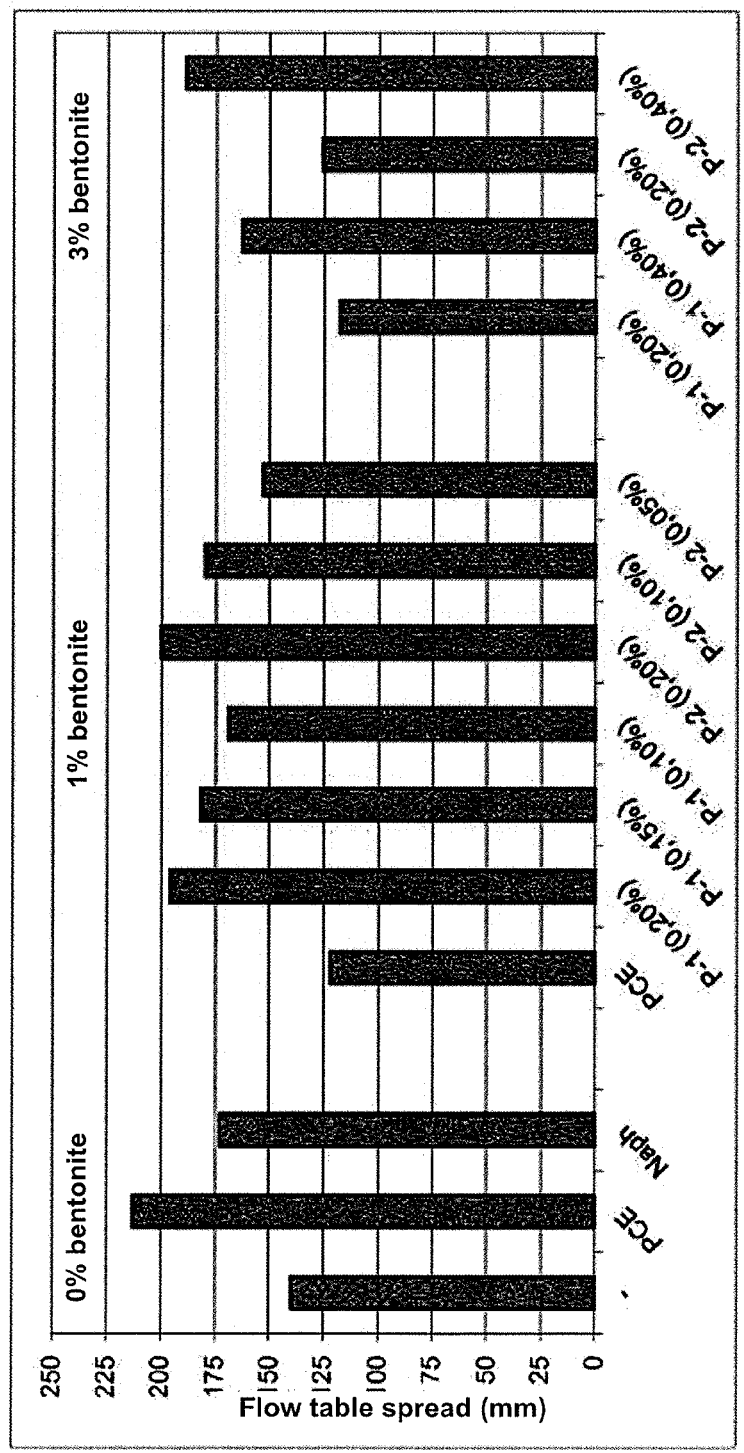
FIG. 2 is a graphic illustration of the results for embodiment examples 20 to 33. For each example, the flow table spread in mm, as indicated in table 3, is represented.
Figure 3:
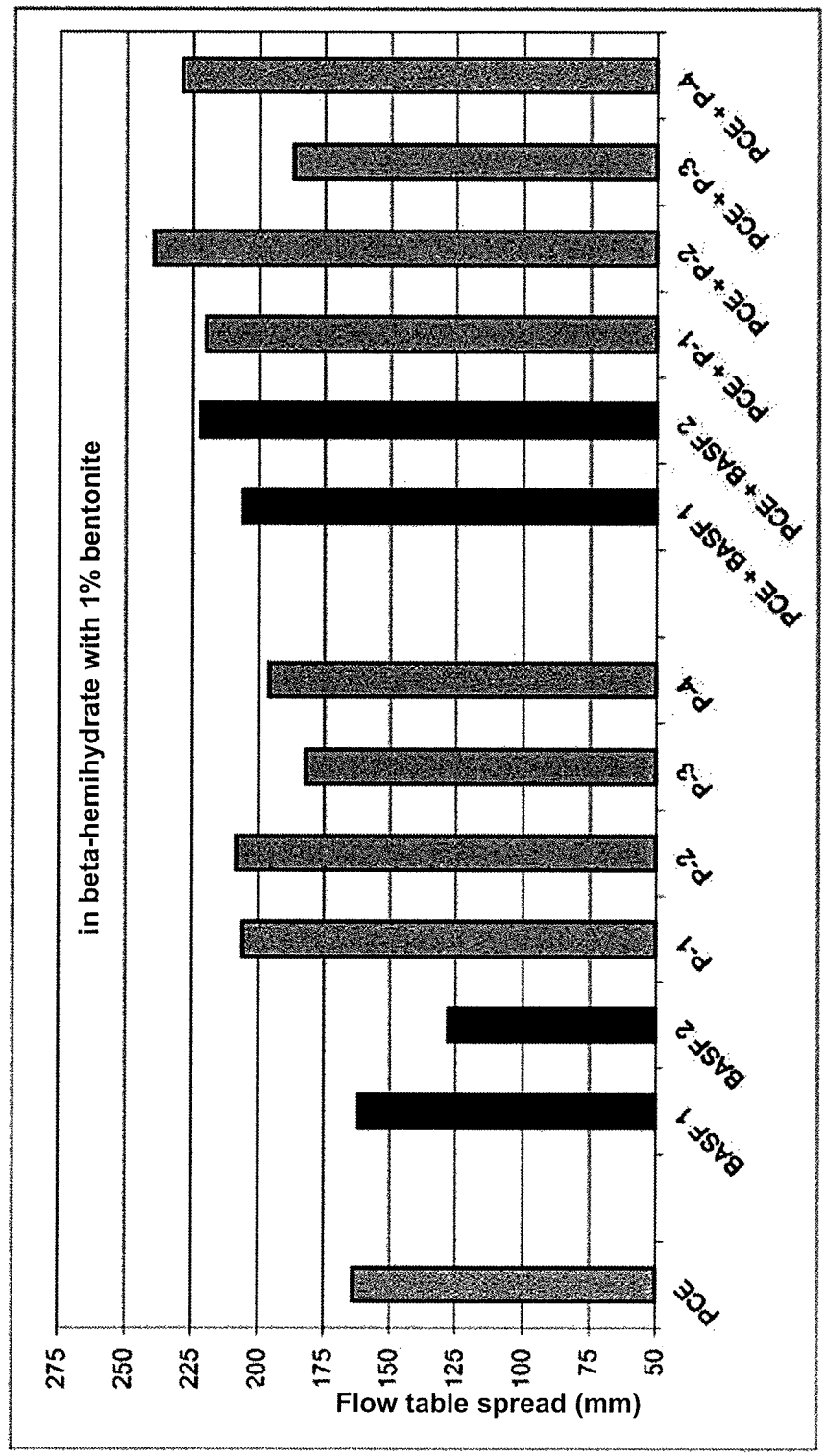

FIG. 3 is a graphic illustration of the results for embodiment examples 34 to 46. For each example, the flow table spread in mm, as indicated in table 4, is represented. The terms "BASF 1" and BASF 2" refer to comb polymers V-1 and V-2 from the prior art.

Figure 4:
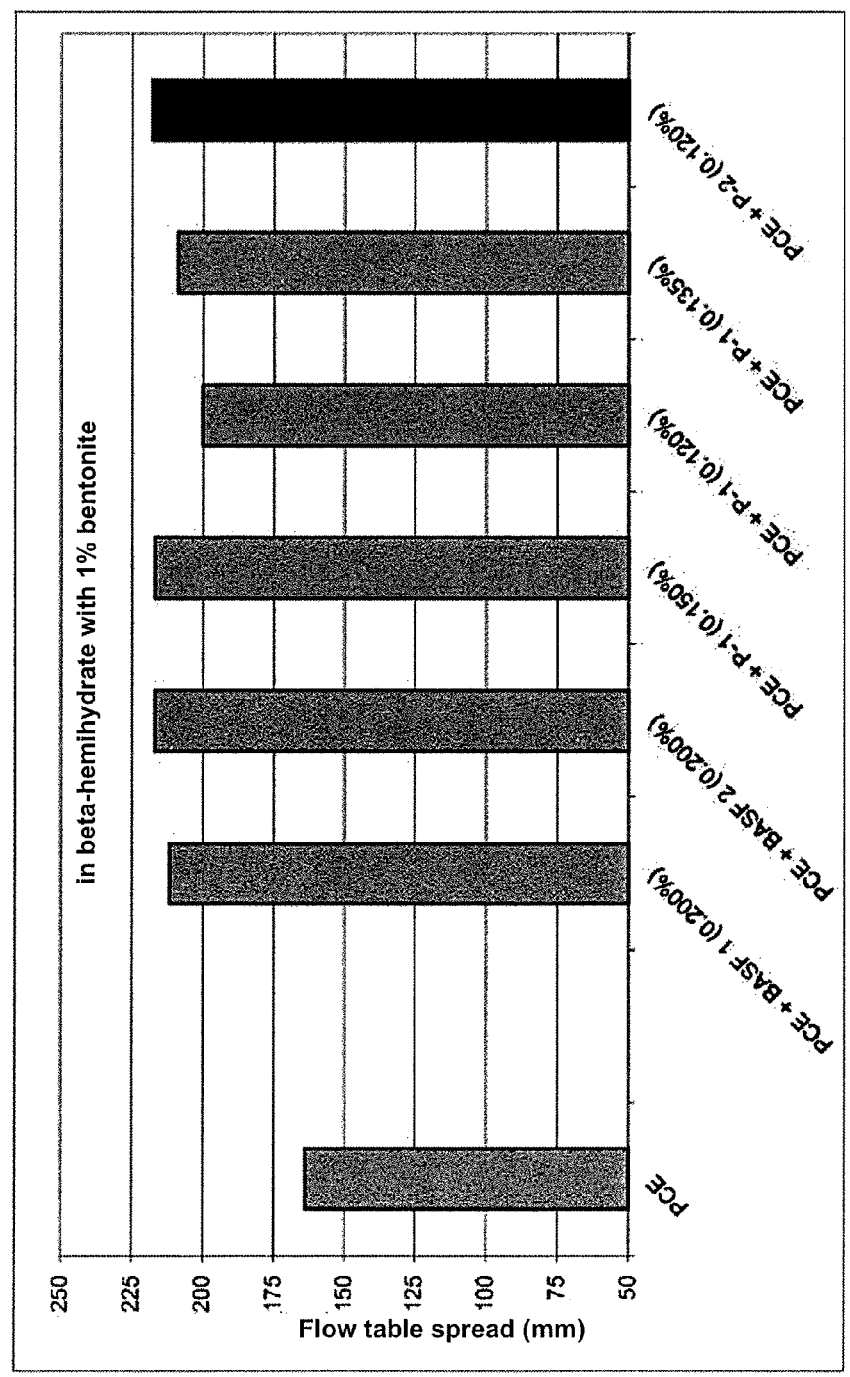

FIG. 4 is a graphic illustration of the results for embodiment examples 47 to 53. For each example, the flow table spread in mm, as indicated in table 5, is represented. The terms "BASF 1" and BASF 2" refer to comb polymers V-1 and V-2 from the prior art.

EMBODIMENT EXAMPLES

Examples 1 to 4: Production of the Polymers

Polymer P-1 according to the invention was produced by placing 70 g water, 27.5 g [2-(methacryloyloxy)-ethyl]-trimethylammonium chloride (75% solution in water; trade name "Visiomer TMAEMC", Evonik Industries, DE), 7.2 g acrylic acid, 1.5 g of a 10% aqueous solution of Fe(II)-$SO_4 \cdot 7H_2O$ and 1.5 g sodium hypophosphite in a reaction vessel equipped with a stirrer. 1.8 g of a 35% aqueous hydrogen peroxide and 1.6 g of a 5% aqueous solution of initiator (sodium hydroxymethyl sulfinate solution, trade name "Rongalit", BASF, DE) was then added dropwise at a temperature of 25-50° C. over a period of 8 minutes with stirring. The reaction solution was cooled to avoid an increase in temperature to above 50° C., and once reaction was completed, stirring was continued for another 10 minutes to remove any residual peroxide.

Polymers P-2 to P-4 were produced in the same manner as polymer P-1, but with different molar fractions of the monomers according to the data summarized in table 1.

TABLE 1

| Example | Polymer | Mol % | Preparation (g) | Infeed (g) | Infeed Time |
|---|---|---|---|---|---|
| 1 | P-1 | m = 50<br>n = 50 | 70 g $H_2O$, 1.5 g Fe(II), 1.5 g chain transfer agent | 1.8 g $H_2O_2$,<br>1.6 g Rongalit | 8 min |
| 2 | P-2 | m = 66<br>n = 34 | 110 g $H_2O$, 2.0 g Fe(II), 2.0 g chain transfer agent | 3.2 g $H_2O_2$,<br>2.0 g Rongalit | 10 min |
| 3 | P-3 | m = 34<br>n = 66 | 70 g $H_2O$, 2.0 g Fe(II), 2.0 g chain transfer agent | 3.2 g $H_2O_2$,<br>2.0 g Rongalit | 12 min |
| 4 | P-4 | m = 100<br>n = 0 | 70 g $H_2O$, 1.5 g Fe(II), 1.5 g chain transfer agent | 3.3 g $H_2O_2$,<br>1.8 g Rongalit | 10 min | m = molar fraction of cationic monomer;
n = molar fraction of acrylic acid

Examples 5 to 33: Production of Settable Gypsum Compositions and Characterization of Flow Behavior The flow table spread (FTS), the start of hardening (SH) and the end of hardening (EH) of gypsum cakes were determined as follows. First, 140 g water was mixed with the comb polymer (plasticizer) and the additive. For this process, the quantity of comb polymer or plasticizer was adjusted beforehand with respect to the quantity of calcium sulfate. In the comparative tests, additives and/or comb polymers were omitted accordingly. 200 g calcium sulfate β-hemihydrate and 0.2 g calcium sulfate dihydrate were then sprinkled into the water over a period of 15 seconds, and the gypsum cake was allowed to soak for 15 seconds. This was then stirred vigorously by hand for 30 seconds. The mini-cone, having a diameter of 50 mm and a height of 51 mm, was filled, and after 75 seconds, the flow table spread (FTS) in millimeters was determined.

The diameter of the resulting gypsum cake was measured as soon as no additional flow was observed. The diameter in mm was referred to as the flow table spread. The start of hardening and the end of hardening were determined using the knife cut method according to DIN EN 13279-2 and the thumbprint method. The start of hardening (SH) is reached when, after a knife cut is made through the gypsum cake, the edges of the cut no longer converge. The end of hardening (EH) is reached when water no longer emerges from the gypsum cake when approximately 5 kg of pressure is applied to the cake using a finger. To precisely and reproducibly adjust the clay content, pure calcium sulfate was mixed with an adjusted quantity of clay. Calcium sulfate-β-hemihydrate together with calcium sulfate dihydrate was used as the gypsum, and bentonite (Sigma-Aldrich Chemie GmbH, CH) was added.

The test conditions and the results of two series of tests are summarized in tables 2 and 3. Non-inventive examples are categorized as "C" (comparative). For purposes of comparison and to test combinations, customary polycarboxyl ether ("PCE"; trade name Sika ViscoCrete G2; Sika, CH) and naphthalene sulfonate (trade name Flube 40, PCC Rokita SA, PL) were used.

Examples 5 to 9 and 20 to 23 show comparative tests in which the comb polymers according to the invention were not added. Tests 5 to 7 and 20 to 22 show the results for gypsum compositions without clay content. A comparison of tests 6 and 8 shows the degree to which flowability is decreased in the presence of clay (example 8). Examples 10 to 13 show that the flowability of clay-containing gypsums can be increased substantially merely by adding the comb polymers according to the invention. The flowability is clearly similar to that of a comparable gypsum without clay content according to example 5. This indicates that the comb polymers according to the invention not only neutralize the clay, but have a plasticizing effect. When polycarboxylate ether is also added, flowability can be further improved to some extent, with levels being achieved in some cases that are within the range of the flowabilities of comparable compositions without clay but with polycarboxylate ethers (Examples 6, 16, 17 and 19). Tests 20 to 33 further demonstrate that flowability can be adjusted and optimized by selecting different comb polymers according to the invention on the basis of different clay contents. Depending on the desired application, the start of hardening and the end of hardening can also be varied and optimized.

Examples 34 to 53: Comparative Tests

Comparative tests were conducted, in which the flow characteristics of gypsum compositions which contain the comb polymers according to the invention or comb polymers according to the prior art of EP 2 463 317 A1 were analyzed. EP 2 463 317 A1 discloses comb polymers which comprise side chains having a cationic group and side chains having polyether groups. For the comparative tests, cationic comb polymers C-1 and C-2 were produced according to the method used in synthesis examples 2 and 3 of EP 2 463 317 A1. The flow characteristics of these comb polymers and of comb polymers P-1 to P-4 according to the invention, from embodiment examples 1 to 4, were then analyzed. In this analysis, flow table spread, start of hardening and end of hardening were determined, as described above for examples 5 to 33.

In a series of tests conducted on embodiment examples 34 to 46, the same volume fractions for the comb polymers were used in each case. The results are summarized in table 4 and illustrated graphically in FIG. 3. The results show that the properties of the comb polymers according to the invention without polyether side chains are substantially improved over those of similar comb polymers having polyether side chains. The gypsum compositions with comb polymers according to the invention have a substantially higher flow table spread. The start of hardening (SH) and the end of hardening (EH) are substantially higher for the comb polymers according to the invention. Overall, the comparative tests show that the properties of the comb polymers without polyether side chains as plasticizers and dispersants are substantially better than those of known comb polymers with polyether side chains.

In a further series of tests conducted on embodiment examples 47 to 53, different volume ratios of the comb polymers according to the invention were used. The gypsum compositions contained customary polycarboxylate ethers (PCE). The results are summarized in table 5, and are illustrated graphically in FIG. 4. The results show that even much smaller quantities of the comb polymers according to the invention are sufficient to achieve a plasticizing effect corresponding to that of comb polymer C-1 or C-2 of EP 2 463 317 A1. Therefore, substantially smaller quantities of the comb polymer according to the invention are sufficient to replace cationic comb polymers from the prior art.

TABLE 2

| Example | Cat. | Bentonite % | β-Hemihydrate % | Polymer Name | Add. % | Additive for Adsorption on Clay Name | Add. % | Flow table spread [mm] | SH [h:min:s] | EH [h:min:s] | Name |
|---|---|---|---|---|---|---|---|---|---|---|---|
| 5 | C | 0.0% | 100.0% | — | 0.00 | — | 0.00 | 140 | 00:02:20 | 00:06:20 | — |
| 6 | C | 0.0% | 100.0% | — | 0.00 | PCE | 0.20 | 213 | 00:04:05 | 00:12:30 | PCE |
| 7 | C | 0.0% | 100.0% | — | 0.00 | Naph | 0.20 | 173 | 00:02:45 | 00:06:55 | Naph |
| 8 | C | 1.0% | 99.0% | — | 0.00 | PCE | 0.20 | 123 | 00:02:25 | 00:08:55 | PCE |
| 9 | C | 1.0% | 99.0% | — | 0.00 | Naph | 0.20 | 166 | 00:02:30 | 00:07:10 | Naph |
| 10 |  | 1.0% | 99.0% | — | 0.00 | P-1 | 0.20 | 182 | 00:06:15 | 00:15:10 | P-1 |
| 11 |  | 1.0% | 99.0% | — | 0.00 | P-2 | 0.20 | 158 | 00:02:45 | 00:14:15 | P-2 |
| 12 |  | 1.0% | 99.0% | — | 0.00 | P-3 | 0.20 | 142 | 00:06:30 | 00:16:00 | P-3 |
| 13 |  | 1.0% | 99.0% | — | 0.00 | P-4 | 0.20 | 150 | 00:02:45 | 00:07:05 | P-4 |
| 14 | C | 1.0% | 99.0% | PCE | 0.20 | — | 0.20 | 122 | 00:02:30 | 00:08:20 | PCE |
| 15 | C | 1.0% | 99.0% |  | 0.00 | Naph | 0.20 | 166 | 00:02:30 | 00:07:10 | Naph |
| 16 |  | 1.0% | 99.0% | PCE | 0.20 | P-1 | 0.20 | 196 | 00:11:30 | 00:20:10 | PCE + P-1 |
| 17 |  | 1.0% | 99.0% | PCE | 0.20 | P-2 | 0.20 | 203 | 00:04:25 | 00:11:25 | PCE + P-2 |

TABLE 2-continued

| Example | Cat. | β-Bentonite % | Hemihydrate % | Polymer Name | Add. % | Additive for Adsorption on Clay Name | Add. % | Flow table spread [mm] | SH [h:min:s] | EH [h:min:s] | Name |
| --- | --- | --- | --- | --- | --- | --- | --- | --- | --- | --- | --- |
| 18 | | 1.0% | 99.0% | PCE | 0.20 | P-3 | 0.20 | 139 | 00:08:55 | 00:21:00 | PCE + P-3 |
| 19 | | 1.0% | 99.0% | PCE | 0.20 | P-4 | 0.20 | 192 | 00:03:30 | 00:10:10 | PCE + P-4 |

Naph = naphthalene sulfonate; PCE = polycarboxylate ether

TABLE 3

| Example | Cat. | β-Bentonite % | Hemihydrate % | Polymer Type | Add. % | Additive for Adsorption on Clay Type | Add. % | Flow table spread [mm] | SH [h:min:s] | EH [h:min:s] |
| --- | --- | --- | --- | --- | --- | --- | --- | --- | --- | --- |
| 20 | C | 0.0% | 100.0% | — | 0.00 | — | 0.00 | 140 | 00:02:20 | 00:06:20 |
| 21 | C | 0.0% | 100.0% | — | 0.00 | PCE | 0.20 | 213 | 00:04:05 | 00:12:30 |
| 22 | C | 0.0% | 100.0% | — | 0.00 | Naph | 0.20 | 173 | 00:02:45 | 00:06:55 |
| 23 | C | 1.0% | 99.0% | PCE | 0.20 | PCE | 0.00 | 122 | 00:02:30 | 00:08:20 |
| 24 | | 1.0% | 99.0% | PCE | 0.20 | P-1 (0.2%) | 0.20 | 196 | 00:11:30 | 00:20:10 |
| 25 | | 1.0% | 99.0% | PCE | 0.20 | P-1 (0.15%) | 0.15 | 182 | 00:06:20 | 00:14:10 |
| 26 | | 1.0% | 99.0% | PCE | 0.20 | P-1 (0.1%) | 0.10 | 169 | 00:03:55 | 00:11:15 |
| 27 | | 1.0% | 99.0% | PCE | 0.20 | P-2 (0.2%) | 0.20 | 200 | 00:04:30 | 00:11:50 |
| 28 | | 1.0% | 99.0% | PCE | 0.20 | P-2 (0.1%) | 0.10 | 180 | 00:03:30 | 00:09:40 |
| 29 | | 1.0% | 99.0% | PCE | 0.20 | P-2 (0.05%) | 0.05 | 153 | 00:03:00 | 00:08:45 |
| 30 | | 3.0% | 97.0% | PCE | 0.20 | P-1 (0.2%) | 0.20 | 118 | 00:03:25 | 00:10:45 |
| 31 | | 3.0% | 97.0% | PCE | 0.20 | P-1 (0.4%) | 0.40 | 163 | 00:18:05 | 00:29:00 |
| 32 | | 3.0% | 97.0% | PCE | 0.20 | P-2 (0.2%) | 0.20 | 126 | 00:03:00 | 00:08:20 |
| 33 | | 3.0% | 97.0% | PCE | 0.20 | P-2 (0.4%) | 0.40 | 189 | 00:03:50 | 00:10:40 |

Naph = naphthalene sulfonate; PCE = polycarboxylate ether

TABLE 4

| Example | Cat. | β-Bentonite % | Hemihydrate % | Polymer Type | Add. % | Additive for Adsorption on Clay Type | Add. % | Flow table spread [mm] | SH [h:min:s] | EH [h:min:s] |
| --- | --- | --- | --- | --- | --- | --- | --- | --- | --- | --- |
| 34 | C | 1.0% | 99.0% | PCE | 0.20 | | 0.00 | 164 | 00:02:55 | 00:09:30 |
| 35 | C | 1.0% | 99.0% | | 0.00 | C-1 | 0.20 | 162 | 00:02:20 | 00:07:05 |
| 36 | C | 1.0% | 99.0% | | 0.00 | C-2 | 0.20 | 128 | 00:02:10 | 00:06:40 |
| 37 | | 1.0% | 99.0% | | 0.00 | P-1 | 0.20 | 206 | 00:09:50 | 00:20:00 |
| 38 | | 1.0% | 99.0% | | 0.00 | P-2 | 0.20 | 208 | 00:04:50 | 00:10:15 |
| 39 | | 1.0% | 99.0% | | 0.00 | P-3 | 0.20 | 182 | 00:09:40 | 00:22:30 |
| 40 | | 1.0% | 99.0% | | 0.00 | P-4 | 0.20 | 196 | 00:02:40 | 00:07:55 |
| 41 | C | 1.0% | 99.0% | PCE | 0.20 | C-1 | 0.20 | 206 | 00:03:55 | 00:12:00 |
| 42 | C | 1.0% | 99.0% | PCE | 0.20 | C-2 | 0.20 | 222 | 00:04:10 | 00:11:40 |
| 43 | | 1.0% | 99.0% | PCE | 0.20 | P-1 | 0.20 | 220 | 00:15:20 | 00:26:00 |
| 44 | | 1.0% | 99.0% | PCE | 0.20 | P-2 | 0.20 | 240 | 00:08:25 | 00:19:00 |
| 45 | | 1.0% | 99.0% | PCE | 0.20 | P-3 | 0.20 | 187 | 00:13:55 | 00:31:00 |
| 46 | | 1.0% | 99.0% | PCE | 0.20 | P-4 | 0.20 | 229 | 00:05:25 | 00:12:30 |

TABLE 5

| Example | Cat. | β-Bentonite % | Hemihydrate % | Polymer Type | Add. % | Additive for Adsorption on Clay Type | Add. % | Flow table spread [mm] | SH [h:min:] | EH [h:min:] |
|---|---|---|---|---|---|---|---|---|---|---|
| 47 | C | 1.0% | 99.0% | PCE | 0.20 | — | — | 164 | 00:02:55 | 00:09:30 |
| 48 | C | 1.0% | 99.0% | PCE | 0.20 | C-1 | 0.200 | 212 | 00:04:00 | 00:12:10 |
| 49 | C | 1.0% | 99.0% | PCE | 0.20 | C-2 | 0.200 | 217 | 00:04:25 | 00:12:15 |
| 50 |   | 1.0% | 99.0% | PCE | 0.20 | P-1 | 0.150 | 217 | 00:09:00 | 00:18:00 |
| 51 |   | 1.0% | 99.0% | PCE | 0.20 | P-1 | 0.120 | 200 | 00:05:20 | 00:12:50 |
| 52 |   | 1.0% | 99.0% | PCE | 0.20 | P-1 | 0.135 | 209 | 00:05:45 | 00:14:00 |
| 53 |   | 1.0% | 99.0% | PCE | 0.20 | P-2 | 0.120 | 218 | 00:04:30 | 00:11:55 |

The invention claimed is:

1. A hydraulically settable composition comprising:
a hydraulically settable binder comprising clay in an amount of 0.1 to 15 wt % relative to the total weight of the hydraulically settable binder, and
at least one zwitterionic comb polymer in an amount of 0.01 to 5 wt %, relative to the total weight of the hydraulically settable binder,
wherein the zwitterionic comb polymer has a main chain and consists of
a) at least one acid unit A of formula (I):

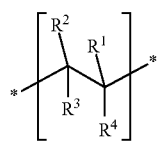

wherein $R^1$, $R^2$ and $R^3$, each independently represent H or an alkyl group having 1 to 5 carbon atoms,
each $R^4$ independently represents —COOM, —CH$_2$COOM, —SO$_2$—OM, —O—PO(OM)$_2$, or —PO(OM)$_2$;
wherein M stands for H, an alkali metal, an alkaline earth metal, ammonium, an ammonium cation, an organic ammonium compound, or mixtures thereof; and
b) at least one cationic structural unit K of formula (II)

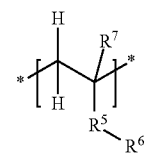

wherein
$R^5$ independently represents —CO—O—R'—, —NH—R'—, —CO—NH—R'—, —O—, R', —O—R'—, or —R'—O—R'—, with R' being a $C_1$ to $C_{20}$ alkylidene group, which can be branched or unbranched;
$R^6$ independently stands for a cationic group, and
$R^7$ independently stands for H or CH$_3$.

2. The composition according to claim 1, comprising at least 15 wt % of a clay-containing gypsum, relative to the total weight of the composition.

3. The composition according to claim 1, wherein a total of structural units with side chains which have at least one cationic group, and structural units with carboxyl groups, is at least 75 mol %, relative to the total number of all monomeric structural units of the main chain of the comb polymer.

4. The composition according to claim 1, wherein a total of structural units with side chains which have at least one cationic group, and structural units with carboxyl groups, is at least 95 mol %, relative to the total number of all monomeric structural units of the main chain of the comb polymer.

5. The composition according to claim 1, wherein a total of structural units with side chains which have at least one cationic group, and structural units with carboxyl groups, is 100 mol %, relative to the total number of all monomeric structural units of the main chain of the comb polymer.

6. The composition according to claim 1, wherein the hydraulically settable composition contains up to 80 wt % water.

7. The composition according to claim 1, wherein the hydraulically settable composition contains up to 50 wt % water.

8. The composition according to claim 2, wherein the clay-containing gypsum contains less than 5 wt % water.

9. The composition according to claim 1, wherein the cationic group is a quaternary ammonium group.

10. The composition according to claim 1, wherein the cationic group has the formula —N$^+$R$^8$R$^9$R$^{10}$, in which R$^8$, R$^9$ and R$^{10}$ each independently represent H, an aliphatic hydrocarbon residue having 1 to 20 C atoms, a cycloaliphatic hydrocarbon residue having 5 to 8 C atoms, or an aryl residue having 6 to 14 C atoms.

11. The composition according to claim 1, wherein the cationic group is a constituent of a monomeric structural unit, selected from the group consisting of [2-(acryloyloxy)-ethyl]-trimethylammonium chloride, [2-(acryloylamino)-ethyl]-trimethylammonium chloride, [2-(acryloyloxy)-ethyl]-trimethylammonium methosulfate, [2-(methacryloyloxy)-ethyl]-trimethylammonium chloride or -methosulfate, [3-(acryloylamino)-propyl]-trimethylammonium chloride, [3-(methacryloylamino)-propyl]-trimethylammonium chloride and diallyldimethylammonium chloride (DADMAC).

12. The composition according to claim 1, wherein the main chain is a polyacrylic acid, a polymethacrylic acid, or a copolymer of acrylic acid and methacrylic acid.

13. The composition according to claim 12, wherein the comb polymer comprises 5 to 100 mol % structural units having side chains which have at least one cationic group, and 10 to 95 mol % structural units having acid groups, each relative to the total number of all monomeric structural units in the main chain of the comb polymer.

14. The composition according to claim 1, wherein the hydraulically settable composition contains cement or gypsum.

15. The composition according to claim 1, wherein the hydraulically settable composition contains at least one additional dispersant.

16. The composition according to claim 15, wherein the at least one further dispersant is a polycarboxylate ether.

17. The composition according to claim 16, wherein a volume ratio of the polycarboxylate ether to the comb polymers is between 1:10 and 10:1.

18. The composition according to claim 16, wherein a volume ratio of polycarboxylate ether to the comb polymers is between 1:2 and 2:1.

19. The composition according to claim 1, wherein the at least one acid unit A is an acrylic acid unit or a salt thereof and/or a methacrylic acid unit or a salt thereof.

20. The composition according to claim 1, wherein the at least one acid unit A is a methacrylic acid unit or a salt thereof.

21. The composition according to claim 1, wherein the cationic group is a constituent of a monomeric structural unit, selected from [2-(acryloyloxy)-ethyl]-trimethylammonium chloride, [2-(acryloyloxy)-ethyl]-trimethylammonium methosulfate, [2-(methacryloyloxy)-ethyl]-trimethylammonium chloride, and [2-(methacryloyloxy)-ethyl]-trimethylammonium methosulfate.

22. The composition according to claim 1, wherein
the at least one acid unit A is an acrylic acid unit or a salt thereof and/or a methacrylic acid unit or a salt thereof, and
the cationic group is a constituent of a monomeric structural unit, selected from [2-(acryloyloxy)-ethyl]-trimethylammonium chloride, [2-(acryloyloxy)-ethyl]-trimethylammonium methosulfate, and [2-(methacryloyloxy)-ethyl]-trimethylammonium chloride, and [2-(methacryloyloxy)-ethyl]-trimethylammonium methosulfate.

23. A molding, obtainable by setting and curing a hydraulically settable composition according to claim 1.

* * * * *